April 15, 1924.
A. W. KNUTSON
1,490,328
ATTACHMENT FOR TRACTORS AND MOTOR VEHICLES
Filed Nov. 19, 1920    3 Sheets-Sheet 2
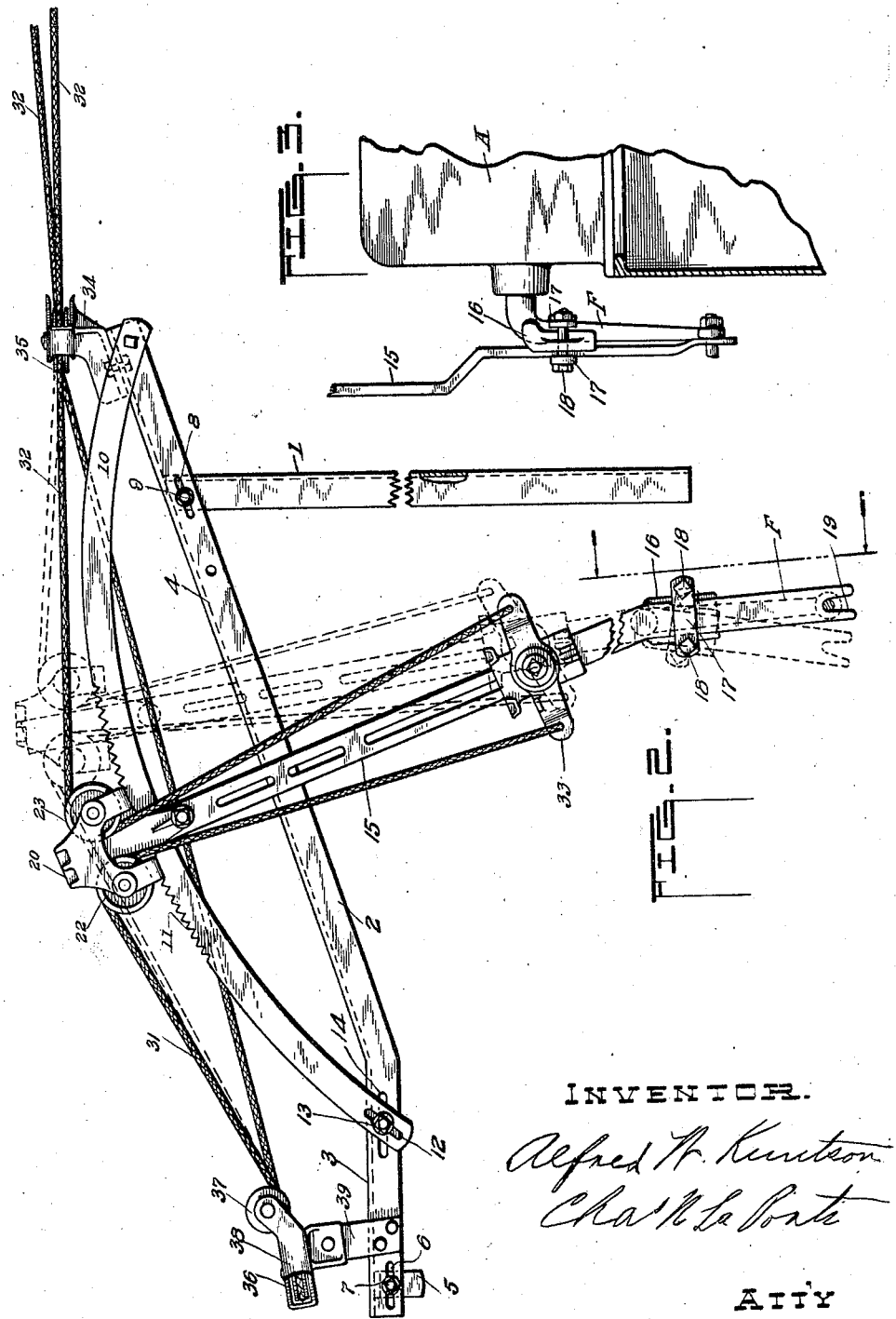
INVENTOR.
Alfred W. Knutson
ATTY

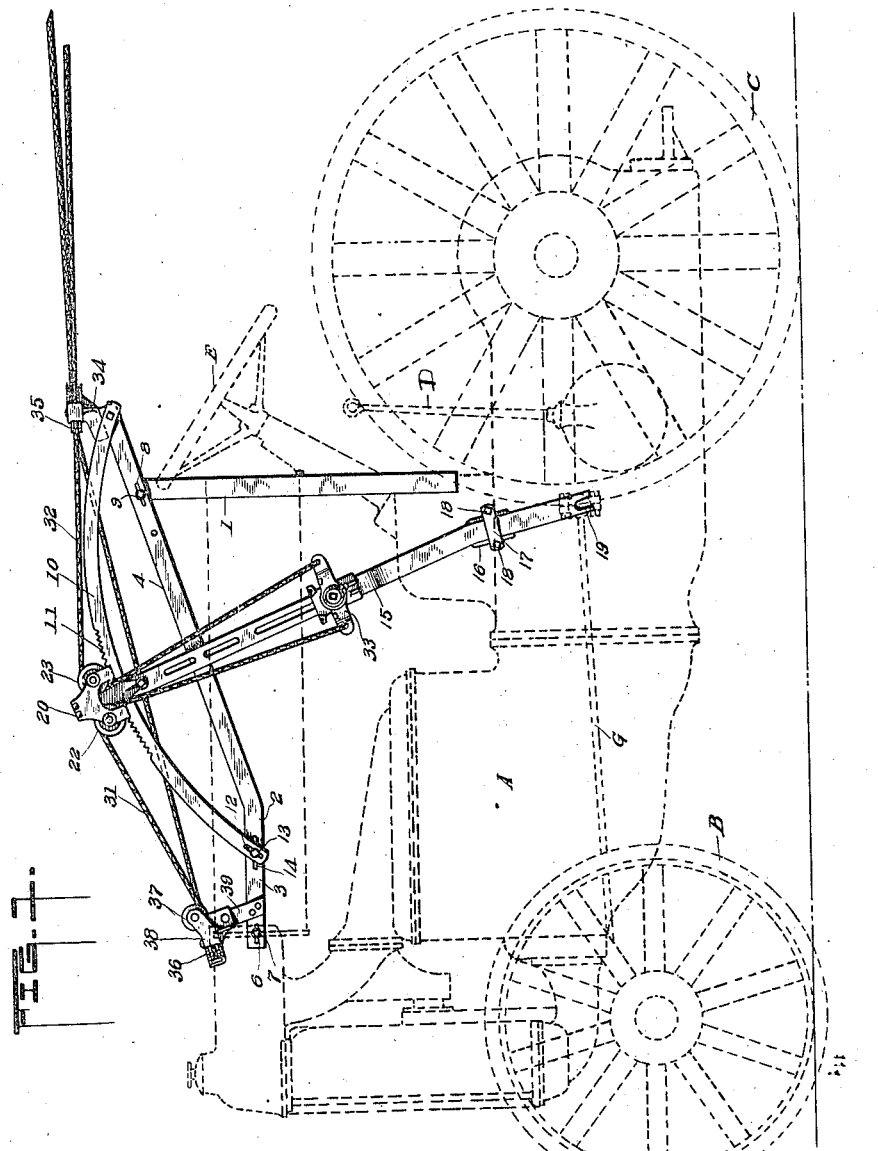

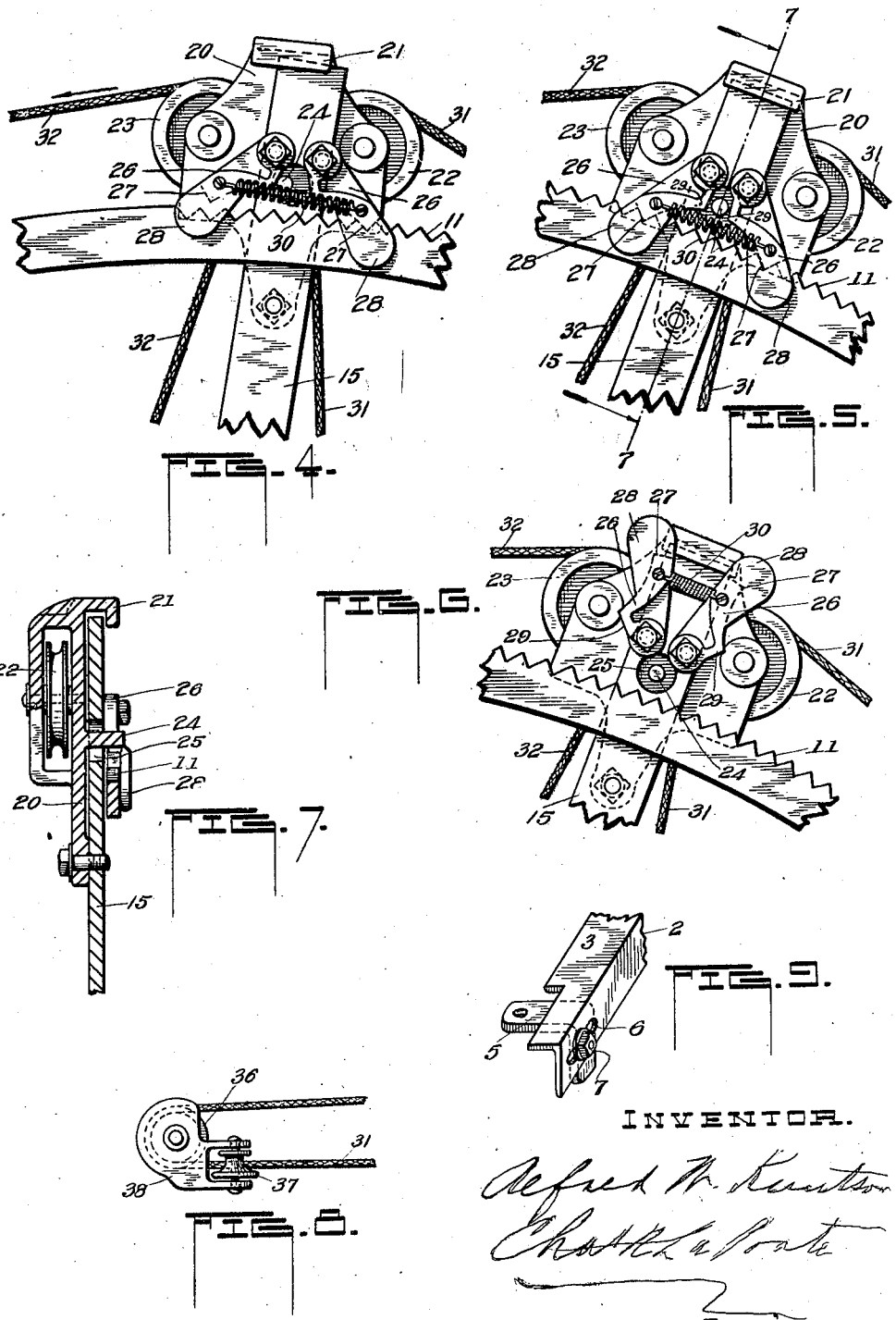

Patented Apr. 15, 1924.

1,490,328

UNITED STATES PATENT OFFICE.

ALFRED W. KNUTSON, OF GALESBURG, ILLINOIS, ASSIGNOR TO ALVIN V. ROWE, OF GALESBURG, ILLINOIS.

ATTACHMENT FOR TRACTORS AND MOTOR VEHICLES.

Application filed November 19, 1920. Serial No. 425,260.

*To all whom it may concern:*

Be it known that I, ALFRED W. KNUTSON, a citizen of the United States, a resident of Galesburg, in the county of Knox and State of Illinois, have invented new and useful Improvements in Attachments for Tractors and Motor Vehicles, of which the following is a specification.

This invention has reference to a rein or line control steering means for motor propelled vehicles, such as farm tractors, automobiles and the like.

The principal object of the invention is to provide a rein or line control steering attachment, which is applicable to motor propelled vehicles or tractors now in use, as distinguished from vehicles or tractors which may embody rein or line controls that are especially built with or for use with such controls.

A further object of the invention is to provide a self contained attachment of the character and for the purposes referred to, which is formed for bodily securement to the tractor or like vehicle, and which includes rein or line control means for the steering appliances of the vehicle. The said attachment including a means for locking the steering appliances against accidental turning of the steering wheels, which may be released, when the operator elects to change from rein or line control to the usual steering wheel control on the tractor or vehicle.

The present invention is designed particularly for attachment to a tractor of the "Fordson" type; however, the principle embodied will be found applicable to other and different types of tractors and motor vehicles.

That the invention may be more fully understood, reference is had to the accompanying drawings forming a part of the present description, illustrating a preferred embodiment of the invention, in which:—

Fig. 1 is a side elevation of a "Fordson" tractor, in dotted lines, with my rein or line control steering attachment secured thereto;

Fig. 2 is a side elevation, partly broken away, showing the attachment on a somewhat larger scale than that seen in Fig. 1, the dotted lines illustrating the movement of a steering part;

Fig. 3 is a detailed end view showing one means of coupling a steering part of the attachment to a crank-arm forming one of the elements of the steering appliances;

Fig. 4 is a detail side elevation of the locking elements for a steering member on the attachment looking in from the rear of Fig. 2, and showing one locking element released and the steering member being moved in the direction of the arrow in said figure;

Fig. 5 is a view similar to Fig. 4 except that both locking elements are in locking position;

Fig. 6 is a view similar to Fig. 4 except that the locking elements are in unlocked position, being the position they should be in when the steering of the tractor is done through and by means of the usual steering wheel;

Fig. 7 is a vertical cross-section, as the same would appear if taken on the line 7—7 Fig. 5;

Fig. 8 is a detail plan view showing a sheave wheel construction for guiding one of the reins or lines, and Fig. 9 is a perspective view illustrating one of the means for securing the steering attachment to the tractor frame or body.

Like characters of reference denote corresponding parts throughout the figures.

In Fig. 1 the tractor A is preferably shown in dotted lines and includes among other structural features the steering wheels B, driving wheels C, gear shifting lever D, usual hand steering wheel E, which is operatively connected with the steering wheels through a crank-arm F and connecting rod G. Said crank-arm being shown in full lines in Fig. 3. All the foregoing devices are common in farm tractors, and the arrangement shown is such as will be found on a "Fordson" farm tractor. While my attachment is arranged for securement to the body or frame of the tractor, connection of the rein or line control steering means is made preferably with the crank-arm F.

The attachment includes the bar 1 secured by suitable means in an upstanding position on one side at the rear of the tractor body or frame. A bar 2 extending lengthwise of the tractor formed of the horizontal part 3 secured to the forward body or frame part of the tractor, and the upwardly and rearwardly inclined part 4 crossing and secured to the upper end of the bar 1. The securing means for the forward end 3 of the bar 2 comprises a bracket 5 suitably bolted to the tractor frame and the bar 2 is slotted, as at 6, through which the securing bolt 7 passes to allow for adjustment in attachment where irregularities in frame construction may appear. Said bar 2 is also slotted, as at 8, through which the securing bolt 9 passes which secures said bar 2 to the bar 1. Said slot 8, like the slot 6 allowing for adjustment where irregularities in frame construction may appear. An arc shaped bar 10 is connected at its forward end to the part 3 of the bar 2 and to the upper rear end of said bar 2. The bar 10 has its upper edge serrated or provided with a plurality of preferably saw shaped teeth 11 and the forward end thereof has a slot 12 to receive a securing bolt 13 passing through a slot 14 in the part 3 of the bar 2. Said slots 12 and 14 giving ample adjustment of the bar 10 so that it may have a proper position to accommodate the upstanding oscillatory bar 15 constituting one of the attachment steering elements which has movement at its upper end therealong.

The steering bar 15 is clamped to the crank-arm F by a clamping plate 16, straps 17 and bolts 18, the lower end of said bar having a slot 19 to straddle a pin providing a connection between the crank-arm F and the rod G. The bar 15 extends upward from the crank-arm F and crosses the arc shaped bar 10, the latter being adjusted to and assuming a position as if struck on an arc of a circle, the center of which is the axis of the crank-arm F, and as will become apparent when the bar 15 is oscillated, the crank-arm F is also oscillated, resulting in a reciprocation of the rod G and a steering of the steering wheels B to turn the tractor to the right or to the left.

To the upper end of the steering bar 15 is pivotally connected a casting 20 which is formed or provided with an overhanging guard or lip 21 within which is seated the end of the bar 15 to retain the upper end of bar and casting in working relation to each other upon the oscillation of the casting and subsequent oscillation of said bar 15 by a pull on either one of the reins or lines, to be described. Said casting has journaled thereon a pair of spaced sheave wheels 22 and 23, and projecting laterally from the main body of the casting is a stem 24 which passes through and may have sidewise movement in a comparatively large opening 25 in the bar 15. To the bar 15, above and on either side of the axis of the opening 25 there are pivotally connected dogs 26 formed with teeth 27 adapted to have inter-engaging relation with the teeth 11 on the bar 10, and when the tooth 27 of one dog 26 is disengaged the tooth 27 on the other dog may ratchet on said bar 10 and permit the bar 15 to be oscillated. Each dog has an apron 28 normally bearing alongside of the bar 10, and each dog is also provided with a shoulder 29 normally lying on either side of the stem 24 of the casting 20, and adapted to be engaged by said stem when the casting is oscillated, which will result in a release of the dog 26 from the teeth 11 on the bar 10 allowing the other dog to ratchet on said bar 10. A spring 30 connects the two dogs 26 and normally holds them in engagement with the teeth 11 on the bar 10 and when one dog is moved by the stem 24 detaching it from the teeth on the bar 10 the expansion of the spring holds the other dog in ratchet relation with the bar 10, and upon the release of the dog by the stem 24 the spring returns said dog into engagement with the teeth on said bar 10; both dogs acting to lock the bar 15 against oscillatory movement, until the release of one or the other, or both said dogs. Locking the bar 15 will also lock the crank-arm F and connecting parts and hold the steering wheels against turning.

The dogs 26 may be swung from locking position, up and back into the position shown in Fig. 6, the spring 30 acting to hold them in this inoperative position. When so positioned the steering appliances may function in their usual manner and be operated from and by means of the usual steering wheel E on the tractor.

Over the sheave wheel 22 passes a rein or line 31 and over the sheave wheel 23 passes a rein or line 32. Thus it will be observed that I have elected to control the steering appliances of the tractor through two reins or lines which may extend to any remote point back of the tractor and to any machine or implement drawn thereby and from which the steering, through the lines, is to be controlled. The reins or lines 31 and 32 may have connection with the bar 15 at any suitable point and in any suitable manner, but I prefer to connect the same with an element 33 on said bar 15, which forms part of a gear shift control, and fuel feed control forming the subject matter of separate applications for patent filed of even date herewith and bearing Serial Numbers. 425,261; 425,262. Both reins or lines are led to the bar 15 through a bracket 34 having journaled therein a sheave wheel 35 to guide said reins or lines. The line or rein 32 may go direct from the sheave wheel 35 to the sheave wheel 23 and element 33, as a direct pull on this rein or line accomplishes the steering desired. To obtain the action desired by a direct pull on the rein or line 31, it is carried to the forward end of the attachment and caused to pass around a horizontally rotating sheave wheel 36 and thence under a vertically rotating sheave wheel 37 and to the sheave wheel 22, see Fig. 2. The two sheave wheels 36 and 37 being journaled in a bracket 38 connected to a support 39 secured in an upright position on the forward end of the bar 2.

In operation, assuming that the driver wishes to steer the tractor through the rein or line 31, he will pull upon said rein or line and it passing over the sheave wheel 22 from the front end of the attachment will first oscillate the casting 20, to the left looking at Figs. 1 and 2, its stem 24 acting to disconnect the near dog 26 from the teeth on the bar 10 permitting the steering bar 15 to be oscillated, which in turn imparts rotational movement to the crank-arm F and reciprocate the rod G to turn the steering wheels B in the desired direction. During this movement the other dog 26 ratchets on the bar 10, as previously explained. Steering may be accomplished in the same manner by a pull on the other rein 32, except that it leads direct to and over the sheave wheel 23, and a pull on this rein or line will result in the steering wheels B turning in a direction opposite to that which will result by a pull on the rein or line 31, all of which it is believed will be understood.

I have stated that the attachment does not interfere with the steering of the tractor through the usual steering wheel and have suggested that when this is done the dogs 26 may be moved to the inoperative position shown in Fig. 6 so as to release the locking means for the steering appliances. I wish, however, to state that my attachment is such that when the operator elects to steer by the usual steering wheel he may also lock the steering appliances so as to relieve the operator from the necessity of giving strict attention to the steering when crossing a field. In this case the line control locking means would remain substantially as shown in Fig. 5 and then when the operator wanted to steer by means of the usual steering wheel he would take hold of either one of the reins or lines 31 or 32 to release the locking means by disconnecting a pawl 26 and permit the tractor to be steered through the usual steering wheel, as it is believed will be understood.

What I claim is:—

1. An attachment for tractors and the like to convert same to rein control steering, including a frame arranged for securement to the tractor body, a bar connected to certain of the tractor steering appliances located between the usual steering post and wheel and the steering wheels and having an oscillatory relation in respect to said frame, means for guiding said bar on said frame, and rein means for operating said bar.

2. An attachment for tractors and the like to convert same to rein control steering, including a frame arranged for securement to the tractor body, a bar connected to certain of the tractor steering appliances located between the usual steering post and wheel and the steering wheels and having an oscillatory relation in respect to said frame, means for guiding said bar on said frame, rein means connected with said bar whereby a selective pull upon said rein means will oscillate said bar alternately in opposite directions, and guiding sheave wheels for said rein means.

3. An attachment for tractors and the like to convert same to rein control steering, including a frame arranged for securement to the tractor body, a bar connected to certain of the tractor steering appliances located between the usual steering post and wheel and the steering wheels and having an oscillatory relation in respect to said frame, means for guiding said bar on said frame, rein means for operating said bar, means to lock the bar and with it the steering appliances, and means actuated by a pull upon said rein means to release said locking means.

4. An attachment for tractors and the like to convert same to rein control steering, including a frame arranged for securement to the tractor body, a bar connected to certain of the tractor steering appliances located between the usual steering post and wheel and steering wheels, rein means for operating said bar, means to lock the bar and with it the steering appliances, said locking means being releasable to permit the actuation of the steering appliances by the usual steering wheel and post, and means actuated by a pull upon said rein means to release said locking means.

5. An attachment of the character and for the purposes described, including a frame, one member of which is arc shaped and provided with a toothed edge, an oscillatory member arranged for connection with a steering appliance, means on said oscillatory member adapted to have a ratchet relation with said toothed member, and rein means connected with said oscillatory member and controlling said ratchet means.

6. An attachment of the character and for the purposes described, including a frame, one member of which is arc shaped and provided with a toothed edge, an oscillatory member arranged for connection with a steering appliance, a member pivotally connected to said oscillatory member, means on said pivoted member arranged for locking said oscillatory member to said toothed member and capable of being released, a rein means for controlling said locking means and for operating said oscillatory member, and guiding sheave wheels for said rein means.

7. An attachment of the character and for the purposes described, including supporting bars, means for adjustably connecting the bars to each other and to their support, an oscillatory bar, means carried by said oscillatory bar adapted to have a locking relation with one of said supporting bars, rein means to release said locking means and actuate said oscillatory bar, and guiding sheave wheels for said rein means, said sheave wheels suitably located and journaled on said supporting bars.

8. In an attachment of the character described, in combination with a crank-arm forming a connection in the steering appliances between the steering wheels and steering post, of an oscillatory member, means for clamping said member to said crank-arm, means to lock the oscillatory member against movement, means to release said locking means, and rein means for actuating said lock releasing means and for subsequently actuating said oscillatory member.

9. In an attachment of the character described, in combination, a frame including a bar having teeth along one edge, an oscillatory bar crossing and adapted to be moved along said toothed bar, a casting pivotally connecting to said oscillatory bar, a pair of dogs pivotally connected to said oscillatory bar and adapted to have engagement with the teeth on said toothed bar, means on the casting for actuating either of said dogs to release the same from said toothed bar, and rein means for oscillating said casting and subsequently said oscillatory bar.

10. In an attachment of the character described, in combination, steering means attachable to the usual steering appliances of a tractor between the usual hand steering wheel and tractor steering wheels, a rein means for operating said steering means, locking means in said rein means, said locking means arranged for selective operation to release the steering means by said rein means when steering through said rein means or by said usual steering wheel.

In witness whereof, I have hereunto affixed my hand this 13 day of November, 1920.

ALFRED W. KNUTSON.